United States Patent Office 3,386,976
Patented June 4, 1968

3,386,976
ALKYLATION OF POLYACRYLATE ESTERS
Ashot Merijan, Rahway, and Frederick Grosser, Midland Park, N.J., assignors to General Aniline & Film Corporation, New York, N.Y., a corporation of Delaware
No Drawing. Filed Sept. 17, 1964, Ser. No. 397,299
16 Claims. (Cl. 260—86.1)

ABSTRACT OF THE DISCLOSURE

Homopolymers of an acrylate ester monomer of the formula:

$$CH_2=CHCOOR$$

wherein R is an alkyl of from 1 to 18 carbon atoms or an alkoxyalkyl in which the total number of carbon atoms in the alkyl groups is from 3 to 6 and copolymers of from 5 to 95% by weight of said acrylate ester monomer and from 95% to 5% by weight of a non-heterocyclic and non-α-olefinic hydrocarbon polymerizable monoethylenically unsaturated monomer are alkylated by heating one mole of such homopolymer or copolymer with 0.05 to 12 moles of an α-olefin of the group consisting of chlorofluoro-α-olefin and fluoro-α-olefin of 2 carbon atoms and an α-olefinic hydrocarbon of at least 4 carbon atoms in solution of an organic solvent common to said homopolymer, copolymer and α-olefin in the presence of 0.025 to 0.30 mole of an organic peroxide catalyst per mole of said α-olefin at a temperature ranging from about 80° C. to 200° C. As a result of such alkylation, homopolymers and copolymers are obtained in which some or all of the individual monomers or comonomers constituting the polymer contain one or more chloro-fluoro-alkyl or fluoro alkyl of at least 2 carbon atoms or alkyl of at least 4 carbon atoms to as many carbon atoms as are contained in the α-olefinic hydrocarbon employed in the alkylation reaction.

---

This invention relates to a new process of alkylating polyacrylate esters whereby a range of polymers is obtained having solubility in a wide range of solvents, from polar to non-polar.

It is well known that polyacrylic esters are somewhat similar to methacrylic esters in solubility. It has been established that polyacrylic esters dissolve in aromatic hydrocarbons, ketones, esters, ether alcohols and ether esters, are swollen by ethers, but are insoluble in water, alcohols and aliphatic hydrocarbons including mineral oils.

Commercial requirements have arisen for homopolymers and copolymers of polyacrylic esters which are soluble in alcohols, aliphatic hydrocarbons, including mineral oils and other non-polar solvents.

To meet the needs of the foregoing requirements it is the principal object of the present invention to provide a new process of alkylating polyacrylic esters, i.e., homopolymers of acrylic ester monomers or copolymers consisting of a mixture of two different acrylic ester monomers or a mixture of an acrylic ester monomer and a non-heterocyclic monoethylenically unsaturated monomer, so as to systematically control the solubility of the alkylated polymers. Thus, by the proper choice of alkylating agent (α-olefin), and the degree of alkylation, it is possible to prepare polymers which are soluble in polar solvents such as alcohols, ketones, esters, and in non-polar solvents such as aliphatic hydrocarbons of from 6 to 60 carbon atoms including isomers thereof, mineral and lubricating oils having a Saybolt viscosity of from 50 to 200 seconds, or polymers having intermediate degrees of solubility between polar and non-polar solvents. This systematic control of the solubility characteristics of the polymer is achieved without destroying the other desirable characteristics imparted by the acrylic ester configuration of the monomer or mixtures of monomers and thus polymers are readily prepared which overcome the solubility deficiencies noted above.

Other objects and advantages will become more clearly apparent from the following description:

We have found that polyacrylic esters are readily alkylated by treating 1 mole of such polymer, i.e., 1 mole of a homopolymer of an acrylic ester monomer, or 1 mole of a copolymer consisting of a mixture of two different acrylic ester monomers, or 1 mole of a copolymer consisting of a mixture of an acrylic ester monomer and a non-heterocyclic polymerizable monoethylenically unsaturated monomer, with 0.05 to 12 moles of an α-olefin in solution of an organic solvent common to the polymer, i.e., homopolymer and copolymer and the α-olefin in the presence of 0.025 to 0.30 mole of an organic peroxide catalyst per mole of α-olefin at a temperature ranging from 80° to 200° C. for a period of time ranging from 2 to 60 hours. The resulting solution of alkylated polymer may be employed as such or, if desired, the organic solvent may be removed by vacuum distillation. The degree of alkylation is determined by the amount of the α-olefin consumed and may range from as low as 1% to 90% by weight of the alkylated polymer. The solubility in polar solvents decreases and the solubility in non-polar solvents increases as the degree of alkylation increases. In other words, homopolymers and copolymers may be obtained in which some or all of the individual monomers or comonomers constituting the polymer contain one or more alkyl groups of at least two carbon atoms to as many carbon atoms as is contained in the α-olefin employed in the alkylation reaction. The average molecular weight of such homopolymers and copolymers varies from 10,000 to about 1,000,000.

In practicing the present invention, it is first necessary to prepare the polyacrylic ester, homopolymer or copolymer, in solution of an organic solvent common to the acrylic ester monomer, mixture of monomers and the α-olefin employed in the subsequent alkylation reaction. In polymerizing an acrylate ester monomer 1 mole thereof is dissolved in an organic solvent such as methanol, ethanol, propanol, isopropanol, butanol, sec-butanol, amyl alcohol, hexanol, 2-ethyl-1-hexanol, ethylene glycol, 1,2-butanediol, 1,4-butanediol, etc. Other solvents such as diacetone alcohol, diethylene glycol, ethylene glycol monomethyl ether acetate, methylene chloride and the like may also be employed. It is to be noted that the nature or character of the organic solvent is immaterial so long as it is a liquid, forms a solution with the acrylate ester monomers and polymers, the non-heterocyclic polymerizable monoethylenically unsaturated monomers and copolymers, the α-olefin and the fluoro and chlorofluoro derivatives thereof and is less susceptible to alkylation than the aforementioned monomers and polymers.

The amount of organic solvent employed is not critical. Any amount which will yield a solution of the monomer, mixture of monomers, and α-olefin or the fluoro or chloro-fluoro derivatives thereof will suffice. However, for purposes of expediency, we found that for every part by weight of monomer, or a mixture of monomers from 2 to 10 parts of organic solvent either by volume or by weight, are sufficient to yield a workable solution.

As catalyst (initiator) for the polymerization of the acrylate ester monomer we employ azobisisobutyronitrile or peroxides in an amount ranging from 0.05 to 1% by weight of the acrylate ester monomer. After the acrylate ester monomer is in solution of the organic solvent and the catalyst has been added, the mixture is heated in a 4-necked flask of sufficient size to accommodate the solution of the reactants and equipped with mechanical stirrer, thermometer, nitrogen inlet and reflux condenser. After a thorough nitrogen purge the mixture is heated. An exotherm will be observed at about 75–80° C. as the polymerization is initiated. The solution is held at 80–100° C. for a period of time ranging from 3 to 6 hours, a sample withdrawn and analyzed for residual monomer. The residual monomer should not be more than 1% of the acrylate ester monomer used, and is usually less than 0.1%, yielding homopolymers having molecular weights from about 10,000 to about 1,000,000. To the resulting polyacrylate solution from 0.05 to 12 moles of an α-olefin are added together with 0.025 to 0.30 moles of an organic peroxide catalyst per mole of α-olefin and the mixture heated at a temperature ranging from 80° to 200° C. for a period of time ranging from 3 to 60 hours. If the alkylation reaction is initiated with a small amount of organic peroxide, for example with 0.025 mole per mole of olefin, an additional amount may be added during the alkylation reaction and the reaction continued until analysis shows a small amount of unreacted α-olefin. The degree of alkylation is determined by the amount of the α-olefin consumed and may range from as low as 1% to 90% by weight of the alkylated polymer. When the alkylation is complete the organic solvent and all the volatiles are removed in vacuum at a maximum pot temperature at from 100° to 150° C. at 1 to 100 mm. mercury pressure. The resulting residue is a relatively viscous and colorless alkylated polyacrylate at room temperature.

The acrylate ester monomers which are first polymerized as such or in admixture and then alkylated with an α-olefin in accordance with the present invention are characterized by the following formula:

wherein R represents either a straight or branched alkyl of from 1 to 18 carbon atoms or an alkoxyalkyl in which the total number of carbon atoms in the alkyl groups range from 3 to 6. As examples of such acrylate esters the following are illustrative: Methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate.

In the polymerization of one mole of a mixture of acrylic ester monomers containing from 5 to 95% by weight of any one of the foregoing acrylic ester monomers and from 95% to 5% by weight of a different acrylic ester monomer or from 95% to 5% by weight of a non-heterocyclic polymerizable monoethylenically unsaturated monomer the procedure is precisely the same as that described for the acrylate ester monomer alone. Copolymers are obtained having molecular weights from about 10,000 to 1,000,000. The procedure for the alkylation of such copolymers is also the same as that described above for the homopolymer.

The various non-heterocyclic polymerizable monoethylenically unsaturated monomers which are copolymerized with the acrylate ester monomers in the aforestated proportions, include vinyl acetate, vinyl methoxyacetate, vinyl diethylacetate, vinyl trimethylacetate, vinyl propionate, vinyl isobutyrate, vinyl butyrate, vinyl lactate, vinyl caproate, vinyl caprylate, vinyl stearate, and methacrylic monomers such as methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexylphenyl methacrylate, 2-nitro-2-methyl propyl methacrylate, diethylaminoethyl methacrylate, ethylidene acetate methacrylate and glycidyl methacrylate, including esters of halo acrylic acids, such as methyl-α-chloro-acrylate, ethyl-α-chloro acrylate, phenyl-α-chloro-acrylate, α-ethylacrylic acid, acrylonitrile, methacrylonitrile, acrylamide, methacrylamide, as well as N-alkyl and N-aryl substituted acrylamides. For the purpose of the present invention, the nature or character of the non-heterocyclic polymerizable monoethylenically unsaturated monomer is immaterial so long as such monomer is capable of copolymerization in any proportion with the acrylate ester monomer.

It is to be noted that a copolymer prepared from a mixture of co-monomers containing as low at 5% by weight of an acrylate ester monomer and 95% by weight of a non-heterocyclic polymerizable monoethylenically unsaturated monomer will contain sufficient methylene ($CH_2$) and methine (CH) groups including the alkyl groups characterized by R in the foregoing formula for alkylation during the simultaneous polymerization and alkylation reaction.

Any α-olefin having a molecular weight of about 28 to as high as 2500 may be employed in the alkylation of the homopolymers and copolymers of the above acrylate ester monomers, alone or in admixture following the substantial completion of the polymerization reaction. In other words, α-olefins ranging from ethene, propene, 1-butene, 1-pentene, 2-ethyl-1-butene, 4-methyl-1-pentene, 2-methyl-1-pentene, 1-hexene, 5-methyl-1-hexene, 2-methyl-1-pentne, 3-ethyl-1-pentene, 1-heptene, 1-octene, 1-nonene, 2-ethyl-1-hexene, 1-decene, 1-dodecene, 1-tetradecene, 1-hexadecene, 1-heptadecene, 1-octadecene, 1-nonadecene, 1-eicosene, 1-docosene, 1-tetracosene, 1-pentacosene to polybutenes of molecular weight of 400 to 2500 may be employed.

Instead of employing any one of the foregoing individual α-olefins, a mixture of commercially available linear α-olefins produced by cracking petroleum wax or by polymerizing lower olefins may also be used as the alkylating agent. The commercial product composiution contains a mixture of linear olefins. Such mixture may contain linear olefins ranging from 6 to 8 carbon atoms, 8 to 10 carbon atoms, 10 to 12 carbon atoms, 12 to 16 carbon atoms, 16 to 20 carbon atoms, and as high as 20 to 42 carbon atoms. For example, the product composition of linear heptene having 92% of mono-olefins, contains 89% of α-heptene, 6% of α-hexene and 5% of α-octene based on the mono-olefin basis. By careful distillation of the commercial product composition substantially individual α-olefins are obtained which may be used as the alkylating agent.

While linear α-olefins are preferred because of their commercial availability, we have found that the numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

Instead of employing ethylene (ethene) as the alkylating agent, chloro-fluoro α-olefins such as for example dichlorovinylidene fluoride ($CCl_2$=$CF_2$), chlorovinylidene fluoride (CHCL=$CF_2$), chlorotrifluoroethylene (CClF=$CF_2$), tetrafluoroethylene ($CF_2$=$CF_2$), vinylidene fluoride ($CH_2$=$CF_2$) may be used to yield a series of new and useful polymers containing on the aforementioned groups a fluoro or chlorofluoro ethane group.

In carrying out the initial polymerization followed by alkylation the organic solvents referred to heretofore readily dissolve the acrylate ester monomer alone, a mixture of two different acrylate ester monomers as well as a mixture of an acrylate ester monomer and a non-heterocyclic polymericable monoethyleneically unsaturated monomer including the α-olefins and the fluoro-α-olefins and the chloro-fluoro-α-olefins.

As peroxide catalyst for the alkylation reaction we can employ any one of the known organic peroxides normally employed as initiators in chemical reactions such as, for example, t-butyl-perbenzoate, di-benzoyl peroxide, benzoyl hydroperoxide, t-butyl hydroperoxide, t-butyl perphthalic acid, p-chlorobenzoyl peroxide, t- butyl peracetate, di-t-butyl peroxide, cumene peroxide, etc.

Where it is desired that the alkylated homopolymer or copolymer be soluble in an aliphatic liquid hydrocarbon of 6 or more carbon atoms, a mineral oil or lubricating oil, the initial polymerization followed by the alkylation reaction is preferably conducted in the presence of a higher boiling aliphatic alcohol such as, for example, hexanol, etc. When the desired degree of alkylation has been obtained, the reaction mixture is subjected to vacuum distillation and the removed higher boiling alcohol is replaced by a saturated aliphatic hydrocarbon having a boiling point higher than the alcohol. After the alcohol has been removed there is obtained a solution of the alkylated polymer in solution of the aliphatic hydrocarbon. Saturated aliphatic hydrocarbons having a boiling point higher than hexanol are legion and commercially available. Hence, no difficulty should be encountered in the selection of such hydrocarbon in preparing a solution of the alkylated homopolymer or copolymer.

The only deviation from the foregoing procedure is where low-boiling α-olefiins of from 2 to 6 carbon atoms and the fluoro- and chloro-fluoro α-olefins are employed as the alkylating agents. In such case the organic peroxide catalyst, preferably di-t-butyl peroxide, and the solution of the homopolymer or copolymer are added into a stainless steel rocker bomb. The low-boiling α-olefin or fluoro- or chloro-fluoro α-olefin is then charged to the bomb and the bomb heated and maintained at a temperature of from 110° to 140° C. for a period of time ranging from 5 to 28 hours. The pressure developed in the bomb may range from 100–1000 p.s.i. After cooling to room temperature the contents of the bomb are discharged into any suitable vacuum distillation equipment to remove the solvent and the residual produce recovered as a solid.

The folowing examples will show how the various acrylate ester monomers, alone or in admixture with other polymerizable monomers, are first polymerized or copolymerized and then alkylated. All parts given are by weight unless otherwise noted.

For the sake of simplicity, the lubricating oil of paraffinic stock having a Saybolt viscosity of 100 seconds marketed by the Socony Mobile Oil Co. is "100 sec. solv." will be referred to hereinafter as "100 sec. solvent."

EXAMPLE I

Into a one liter, four-necked flask equipped with mechanical stirrer, thermometer, nitrogen inlet and reflux condenser, after a thorough nitrogen purge, the following ingredients were charged and heated:

Methyl acrylate=43.0 grams (0.5 mole)
Hexanol=150 grams
Azobisisobutyronitrile=0.3 grams (0.7% by weight of acrylate)

The mixture was heated as a mild nitrogen purge was carried on in the system. An exotherm was observed at about 75° C. as the polymerization initiated. The solution was held at 80°–100° C. for four hours and then a sample withdrawn and analyzed for the residual monomer. The solution was found to contain 0.12% methyl acrylate, corresponding to 0.23 gram or only 0.54% of the acrylate used. Then to the above poly (methyl acrylate) solution the following ingredients were charged:

α-Dodecene=252 grams (1.5 moles)
Di-t-butyl peroxide=15 grams (0.1 mole)

and the mixture heated and maintained at 120–140° C. for 24 hours. An additional 8 grams of peroxide (total=23 grams, 0.15 mole) was added and the reaction continued for another 16 hours (total=40 hours). The contents after cooling were analyzed and found to contain 6.2% by weight unreacted α-dodecene corresponding to 29 grams of the olefin. When the solvent and all the volatiles were removed in vacuum (max. pot temperature of 140° C. at 1–2 mm. of mercury), the remaining residue was a relatively viscous and colorless mass at room temperature. This product which weighed 270 grams was soluble in a broad range of organic solvents such as alcohols, ketones, esters.

EXAMPLE II

Into a one liter, four-necked flask equipped with mechanical stirrer, thermometer, nitrogen inlet and reflux condenser, after a thorough nitrogen purge, the following ingredients were charged and heated:

Ethyl acrylate=200.0 grams (2.0 mole)
Ethanol=300.0 grams
Di-benzoyl peroxide=1.5 grams The contents were heated and maintained at reflux for four hours. Residual monomer analysis at the end of this period was nil. The polymeric solution with additional 50 grams of ethanol rinse was discharged into a one-liter stainless steel rocker bomb. Then 20.0 grams of di-t-amyl peroxide was added and the bomb chilled with Dry Ice and 150 grams 1-butene injected. The bomb was then sealed, heated and maintained at 110°–130° C. with shaking for 18 hours. After cooling and venting the bomb, another 20.0 grams of di-t-amyl peroxide was added and 150 grams more 1-butene injected. The bomb was again maintained at 110°–130° C. for 18 hours. Fnally the bomb was cooled, vented and discharged into a two-liter reaction flask and refluxed for an hour to remove any dissolved (but unreacted) butene. Based on material balance 192.0 grams had been gained as butene. The clear product-solution was then placed in vacuum oven for 48 hours at 100° C. (aspirator vacuum) and all the volatiles removed. The dried product (97% solids) was a very light colored fluid at >50° C. but a soft flexible solid at room temperature. It was soluble in hydrocarbons (including heptane and mineral oils), alcohols, ketones, esters, halo-carbons but insoluble in water.

EXAMPLE III

Into a one liter, four-necked flask equipped with mechanical stirrer, thermometer, nitrogen inlet and reflux condenser, after a thorough nitrogen purge, the following ingredients were charged and heated:

Propyl acrylate=114.0 grams (1.0 mole)
n-Butanol=200 grams
Azobisisobutyronitrile=0.1 gram.

The contents were maintained at reflux (117–124° C.) for two hours and then another 0.2 gram catalyst was added and the reflux continued for four more hours (total of six hours). Residual monomers analysis indicated the total disappearance of the acrylate monomer.

To the polymeric solution thus obtained the following were then added:

α-Eicosene=252.0 grams (0.9 mole)
n-Butanol=50 grams
Di-t-butyl peroxide=13.1 grams (0.09 mole)

The cloudy solution was heated back to reflux (120°–126° C.—clear at reflux) and maintained for six hours. Then a second addition of 13.1 grams peroxide was made (total=26.2 grams, 0.18 mole) and the solution maintained under reflux for twenty-four more hours (total, 30 hours). The contents were cooled and a sample withdrawn and analyzed. The residual olefin was found to be 4.7% by weight of the solution, corresponding to 29 grams of unreacted α-eicosene (i.e., 88.5% alkylation based on olefin). As the alkylated product was to be evaluated in lubricating oils, the solvent was stripped in vacuum (max. pot temperature of 145° C. at 3.0 mm. of mercury) while simultaneously 366 grams of 100 sec. solv. was added from a dropping funnel. The final 50% oil solution thus obtained weighed 730 grams and was a light brown viscous fluid.

EXAMPLE IV

As in Example I, after an initial nitrogen purge of the flask, the following ingredients were charged (mild nitrogen pressure was maintained throughout the experiment):

Butyl acrylate=64.0 grams (0.5 mole)
Isopropyl acrylate=57.0 grams (.5 mole)
n-Amyl alcohol=200 grams
Di-benzoyl peroxide=1.0 gram The contents were then stirred, heated and maintained at 80°–100° C. After two hours, a second addition of 1.0 gram di-benzoyl peroxide was made and refluxing continued. At the completion of a total of eight hours copolymerizaiton, an analytical sample was withdrawn while the contents were maintained in the above conditions. Residual monomer analysis showed no remaining trace of either acrylic monomer. Then the solution was further heated to 125°–140° C. range and the following added within a period of five minutes:

α-Hexadecene=224.0 grams (1.0 mole)
Di-t-butyl peroxide=15.0 grams (0.1 mole-initial)
n-Amyl alcohol=100 grams The resulting solution was maintained at the 125°–140° C. range for fourteen hours and then another 10.0 grams of the di-t-butyl peroxide was added (total=25.0 grams, 0.17 mole) and alkylation continued for ten more hours (total=24 hours). A residual olefin analysis indicated 2.68% α-hexadecene by weight of the solution corresponding to 18 grams of unreacted olefin, (i.e., 92% alkylation based on olefin). The product, after the total removal of solvent in vacuum (max. pot. temp. of 140° C. at 5.0 mm. of mercury), weighed 342 grams and was a colorless viscous fluid which was soluble in hydrocarbons including mineral oil, halogenated hydrocarbons, alcohols, esters and ketones.

EXAMPLE V

Into a 500 ml., four-necked flask equipped with stirrer, thermometer, nitrogen inlet and reflux condenser, the following ingredients were charged:

2-ethylhexyl acrylate=70.0 grams (0.38 mole)
N-isopropyl acrylamide=30.0 grams (0.26 mole)
Ethanol=160 grams
Azobisisobutylronitrile=0.5 gram The flask was purged with nitrogen and the contents heated and maintained at reflux (80°–86° C.) for six hours. Analysis of the contents at the end of this period indicated no residual acrylic monomers in the solution. The polymeric solution was then transferred into a one-liter stainless steel rocker bomb with a flask-rinse of 40 grams ethanol. Into the bomb was then added:

1-octene=101 grams (0.9 mole)
t-Butyl hydroperoxide (90%)=20.0 grams (0.2 mole)

and the bomb sealed and heated with shaking. After maintaining the bomb at 120°–135° C. for 16 hours, it was cooled and the contents filtered and analyzed. Residual 1-octene determined was 2.63% by weight of the solution, corresponding to 11 grams only. The bomb contents were then placed into a one-liter resin flask and the latter submerged half-way into a silicone oil bath and the solvent including the unreacted octene removed in vacuum. (Final conditions: 130° C./2.0 mm. mercury for six hours). The product thus obtained was a colorless flexible solid at room temperature with 1.92% nitrogen and it was soluble in a wide range of polar and non-polar solvents.

EXAMPLE VI

As in Example I, after purging the system with nitrogen, the following ingredients were charged and heated:

n-Hexyl acrylate=75.0 grams (0.48 mole)
n-Butyl methacrylate=25.0 grams (0.176 mole)
n-Butanol=160 grams
Azobisisobutyronitrile=0.4 gram The contents were maintained at 80°–100° C. for six hours and then a sample withdrawn and analyzed for residual monomer. The solution was found to contain less than 0.1% acrylic monomer by weight. The contents were then heated and while at reflux a solution of the following ingredients added dropwise from a dropping funnel within a 20-minute period.

1-octadecene=126.0 grams (0.5 mole)
Di-t-butyl peroxide=15.0 grams (0.1 mole)
n-Butanol=80 grams The refluxing was continued (120°–126° C.). The solution became cloudy after the addition, but slowly cleared within one-half hour. After 20 hours at reflux, the contents were cooled and analyzed. The residual olefin was found to be 3.1% by weight of solution corresponding to 15 grams unreacted octadecene (i.e., 88% alkylation based on the olefin).

As the product was to be evaluated in an oil medium, 226 grams of 100 sec. solv. (equal to the total weight of acrylic monomers and octadecene) was added and the solvent stripped in vacuum (120° C./5 mm. mercury). The resulting 50% oil solution was a very light amber colored fluid at room temperature.

EXAMPLE VII

After a thorough purge of the system with nitrogen, the following ingredients were charged into the flask:

Vinyl isobutyl ether=30.0 grams (0.3 mole)
Methyl isobutyl carbinol=100.0 grams
Lauroyl peroxide=1.0 gram At the same time, the following solution was prepared and placed in the dropping funnel:

Ethyl acrylate=70.0 grams (0.7 mole)
Methyl isobutyl carbinol=100.0 grams

The contents of the flask were heated and maintained at 80°–100° C. while the acrylic solution was added dropwise into the flask within one-half hour period. The resulting solution was maintained another four hours at the above temperature range and then analyzed. Analysis indicated no residual trace of either comonomer in the solution. The contents were then heated and maintained at 125°–140° C. while the following prepared solution was added from the dropping funnel within 20 minutes:

Di-t-butyl peroxide=15.0 grams (0.1 mole)
Methyl isobutyl carbinol=50.0 grams
Chevron C 15–20 α-olefins=183.0 grams (0.75 mole)

(a mixture of cracked wax α-olefins with about 92% of the unsaturation in the terminal position and with an average molecular weight of 244 marketed by California Chemical Company).

The contents were maintained at 125°–140° C. for 22 hours and then cooled and analyzed. Olefin analysis showed 5.66% C 15–20 α-olefins by weight of the solution corresponding to 31 grams unreacted olefin (i.e., 83% alkylation based on the olefin).

As the product was to be evaluated in lubricants, the solvent and volatiles were stripped in vacuum (Final conditions: 144° C. pot. temp. at 4.0 mm. mercury) and 283 grams of 100 sec. solv. added to obtain a 50% clear oily solution.

From the foregoing specification and illustrative working examples it becomes clearly evident that by the alkylation process of the present invention the solubility of the polymers, homo- and co-polymers, can be systematically controlled, both by the type of α-olefin used and the amount thereof, so that polymers whch are still soluble in polar solvents, such as alcohols to polymers which are soluble in aliphatic hydrocarbons, mineral and lubricating oils can be obtained as well as polymers having intermediate degrees of solubility between polar and nonpolar solvents. Thus, polymers with a low degree of alkylation are still soluble in ethanol, so that they can be formulated with "Freons" as aerosol hair sprays, but their sensitivity to moisture is reduced. These polymers can also be formulated into adhesives with superior properties because of their increased resistance to moisture. Polymers with a high degree of alklation are soluble in hydrocarbon liquids and liquid petroleum products. When dissolved in kerosenes, jet fuels, furnace oils and similar combustible liquids at a concentration from about 0.001% to 2% by weight, they provide effective protection against deposition or separation of gums, resins and sludges. They are effectively useful as viscosity index improvers and as gum resin and sludge dispersants in lubricating oils. When dissolved in lubricating oils at a concentration from about 0.03% to 5% by weight they readily disperse gums, resins and sludges which may form and thus prevent their deposition on engine parts. The homopolymer and copolymer alkylates of α-olefins of from 8 to 42 carbon atoms are a new class of products and are especially useful as dispersants for engine oils since they leave no deposit, i.e., they are ashless.

When employing α-olefins of from 2 to 4 carbon atoms during the homo- or co-polymerization, polymers are obtained which are more flexible and less tacky under high humidity conditions than the unalkylated polymers or copolymers. The flexibility increases and the tack at high humidity decreases as the percent alkylate increases.

The homopolymer and copolymer alkylates of chlorofluoro-α-olefin and fluoro-α-olefin of 2 carbon atoms are a new and useful class of products having fire retardant properties. They are especially useful in the formulation of fire-retardant adhesives, i.e., bonding agents for paper, plastics and textile fabrics. From solutions in a variety of organic solvents or as emulsions, the polymers form smooth, continuous films which make them particularly useful as fire-retardant precoating agents for polyester laminates.

We claim:

1. The process of alkylating polyacrylate esters which comprises heating one mole of a polyacrylate ester selected from the class consisting of homopolymers of an acrylate ester monomer of the formula $CH_2=CHCOOR$ wherein R is a member selected from the group consisting of alkyl of from 1 to 18 carbon atoms and alkoxyalkyl in which the total number of carbon atoms in the alkyl groups is from 3 to 6 and copolymers of from about 5 to 95% by weight of said acrylate ester monomer and from about 95% to 5% by weght of a non-heteroyclic and non-α-olefinic hydrocarbon polymerizable monoethylenically unsaturated monomer with 0.05 to 12 moles of an α-olefin selected from the class consisting of chlorofluoro-α-olefin and fluoro-α-olefin of 2 carbon atoms and an α-olefin of at least 4 carbon atoms in solution of an organic solvent common to said polyacrylate ester and said α-olefin in the presence of 0.025 to 0.30 mole of an organic peroxide catalyst per mole of said α-olefin at a temperature ranging from about 80° to 200° C.

2. The process of alkylating poly(methyl acrylate) which comprises heating one mole of poly(methyl acrylate) with 3 moles o α-dodecene in solution of hexanol in the presence of about 0.3 mole of di-t-butyl peroxide at a temperature of about 120°–140° C.

3. The process of alkylating poly(propyl acrylate) which comprises heating one mole of poly(propyl acrylate) with 0.9 mole of α-eicosene in solution of n-butanol in the presence of about 0.18 mole of d-t-butyl peroxide at a temperature of about 120°–126° C.

4. The process of alkylating poly(ethyl acrylate) which comprises heating one mole of poly(ethyl arcylate) with 1.71 moles of 1-butene in solution of ethanol in the presence of about 0.23 mole of di-t-amyl peroxide at a temperature of about 110°–130° C.

5. The process of alkylating a copolymer of butyl acrylate and isopropyl acrylate which comprises heating one mole of said copolymer with one mole of α-hexadecene in solution of n-amyl alcohol in the presence of about 0.17 mole of di-t-butyl peroxide at a temperature of about 125°–140° C.

6. The process of alkylating a copolymer of ethyl acrylate and vinyl isobutyl ether which comprises heating one mole of said copolymer with 0.75 mole of a mixture of α-olefins of from 15 to 20 carbon atoms having an average molecular weight of 244 in solution of methyl isobutyl carbinol in the presence of about 0.1 mole of di-t-butyl peroxide at a temperature of about 125°–140° C.

7. The process of alkylating polyacrylate esters which comprises heating one mole of a polyacrylate ester in which the acrylate ester monomer has the formula $CH_2=CHCOOR$ wherein R is a member selected from the group consisting of alkyl of from 1 to 18 carbon atoms and alkoxyalkyl in which the total number of carbon atoms in the alkyl groups is from 3 to 6 with 0.05 to 12 moles of an α-olefin selected from the class consisting of chlorofluoro-α-olefin and fluoro-α-olefin of 2 carbon atoms and an α-olefin of at least 4 carbon atoms in solution of an organic solvent common to said polyacrylate ester and said α-olefin in the presence of 0.025 to 0.30 mole of an organic peroxide catalyst per mole of said α-olefin at a temperature ranging from about 80° to 200° C.

8. The process according to claim 7 wherein the polyacrylate ester is poly(methyl acrylate).

9. The process according to claim 7 wherein the polyacrylate ester is poly(propyl acrylate).

10. The process according to claim 7 wherein the polyacrylate ester is poly(ethyl acrylate).

11. The process according to claim 7 wherein the polyacrylate ester is a copolymer of butyl acrylate and isopropyl acrylate.

12. The process according to claim 7 wherein the polyacrylate ester is a copolymer of ethyl acrylate and vinyl isobutyl ether.

13. The product prepared in accordance with the process of claim 1.

14. The product prepared in accordance with the process of claim 2.

15. The product prepared in accordance with the process of claim 3.

16. The product prepared in accordance with the process of claim 4.

References Cited

UNITED STATES PATENTS 2,542,771  5/1967  Hanford et al. _____ 260—878

JOSEPH L. SCHOFER, *Primary Examiner.*

H. WONG, JR., *Assistant Examiner.*